US012800739B2

(12) United States Patent
Tsuda et al.

(10) Patent No.: US 12,800,739 B2
(45) Date of Patent: Nov. 17, 2026

(54) MOBILE CRANE

(71) Applicant: TADANO LTD., Kagawa (JP)

(72) Inventors: Kazuaki Tsuda, Kagawa (JP); Takuto Koyanagi, Kagawa (JP); Shota Nakamatsu, Kagawa (JP); Shuhei Asano, Kagawa (JP); Kenji Kawanishi, Kagawa (JP); Shingo Nasu, Kagawa (JP)

(73) Assignee: TADANO LTD., Kagawa (JP)

(*) Notice: Subject to any disclaimer, the term of this patent is extended or adjusted under 35 U.S.C. 154(b) by 179 days.

(21) Appl. No.: 18/730,811

(22) PCT Filed: Feb. 15, 2023

(86) PCT No.: PCT/JP2023/005321

§ 371 (c)(1),
(2) Date: Jul. 22, 2024

(87) PCT Pub. No.: WO2023/166994

PCT Pub. Date: Sep. 7, 2023

(65) Prior Publication Data

US 2025/0102652 A1 Mar. 27, 2025

(30) Foreign Application Priority Data

Mar. 1, 2022 (JP) ................................ 2022-030996

(51) Int. Cl.
*G01S 7/521* (2006.01)
*B66C 13/00* (2006.01)
(Continued)

(52) U.S. Cl.
CPC .............. *G01S 7/521* (2013.01); *B66C 13/00* (2013.01); *G01S 15/08* (2013.01); *G01S 15/931* (2013.01);
(Continued)

(58) Field of Classification Search
CPC ........ G01S 7/521; G01S 15/08; G01S 15/931; G01S 2015/93; B66C 13/00; B66C 23/36; B66C 2700/0371
See application file for complete search history.

(56) References Cited

FOREIGN PATENT DOCUMENTS

CN 202897851 U * 4/2013
CN 206529218 U * 9/2017
(Continued)

OTHER PUBLICATIONS

Apr. 11, 2023, International Search Report issued for related PCT Application No. PCT/JP2023/005321.
(Continued)

*Primary Examiner* — Abdallah Abulaban
(74) *Attorney, Agent, or Firm* — Paratus Law Group, PLLC

(57) ABSTRACT

This mobile crane comprises a boom and a traveling vehicle body for supporting the boom, and travels in a state where the boom is brought down forward. The crane has: a distance detection device which has an ultrasonic sensor disposed on the front side of the traveling vehicle body and which detects a distance between the ultrasonic sensor and a detection object; and a shielding member which is disposed between the ultrasonic sensor and the boom in a traveling state and which shields ultrasonic waves emitted from the ultrasonic sensor.

9 Claims, 15 Drawing Sheets

(51) Int. Cl.
*G01S 15/08* (2006.01)
*G01S 15/931* (2020.01)
*B66C 23/36* (2006.01)

(52) U.S. Cl.
CPC ...... *B66C 23/36* (2013.01); *B66C 2700/0371* (2013.01); *G01S 2015/937* (2013.01)

(56) References Cited

FOREIGN PATENT DOCUMENTS

| | | | | |
|---|---|---|---|---|
| JP | 2003238077 | A | * | 8/2003 |
| JP | 2021-187636 | A | | 12/2021 |

OTHER PUBLICATIONS

Apr. 11, 2023, International Search Opinion issued for related PCT Application No. PCT/JP2023/005321.

* cited by examiner

MOBILE CRANE

CROSS REFERENCE TO PRIOR APPLICATION

This application is a National Stage Patent Application of PCT International Patent Application No. PCT/JP2023/005321 (filed on Feb. 15, 2023) under 35 U.S.C. § 371, which claims priority to Japanese Patent Application No. 2022-030996 (filed on Mar. 1, 2022), which are all hereby incorporated by reference in their entirety.

TECHNICAL FIELD

The present invention relates to a mobile crane.

BACKGROUND ART

Nowadays, detectors are often provided to traveling vehicles, such as automobiles, in order to prevent, for example, collisions. Patent literature 1 discloses a technique that enables a mobile crane to stop at a desired position, based on a detection result from a distance detector provided on the front side of the vehicle body of the mobile crane.

CITATION LIST

Patent Literature

Patent Literature 1: JP 2021-187636 A

SUMMARY OF THE INVENTION

Problems to be Solved by the Invention

Similarly to ordinary automobiles, preferably, mobile cranes each have its vehicle front provided with a detector that detects an obstacle, such as a vehicle or human ahead, at the time of traveling.

Regarding such a mobile crane including a boom on a lateral side of its driver cabin as in Patent Literature 1, the boom is likely to limit the field of front vision of the driver. Thus, preferably, a detector is provided at least to the vehicle front on the side on which the boom is located with respect to the driver cabin.

A mobile crane disclosed in Patent Literature 1 has a boom that is high in position and has a relatively small amount of forward protrusion at the time of traveling. Thus, the boom is no obstacle to such a detector as above. However, regarding a mobile crane having a boom that is lowered to a lower position of its vehicle front at the time of traveling or a mobile crane having a boom having a large amount of protrusion from its vehicle front, such a detector as above is likely to detect the boom accidentally.

An object of the present invention is to provide a mobile crane including a detector prevented from detecting a boom accidentally at the time of traveling.

Solutions to Problems

According to an aspect of the present invention, provided is a mobile crane including:

a boom;

a traveling vehicle body supporting the boom;

a distance detection device including an ultrasonic sensor provided on a front side of the traveling vehicle body, the distance detection device being configured to detect a distance between the ultrasonic sensor and a detection object; and a shielding member provided between the boom in a state allowing traveling and the ultrasonic sensor, the shielding member being configured to block ultrasound emitted by the ultrasonic sensor, in which the mobile crane travels with the boom laid forward.

Effects of the Invention

According to the present invention, provided can be a mobile crane including a detector prevented from detecting a boom accidentally at the time of traveling.

DESCRIPTION OF EMBODIMENTS

First Embodiment

Figure 1:
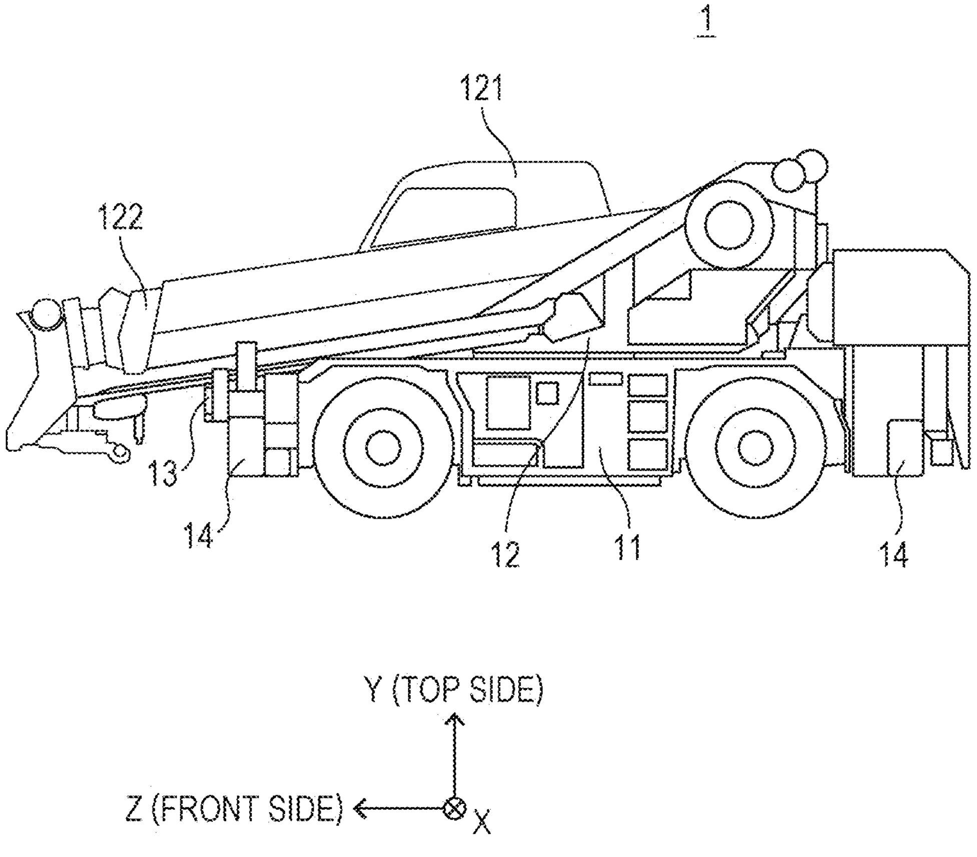
FIG. 1 is a side view of a mobile crane in a form for traveling.
Figure 2:
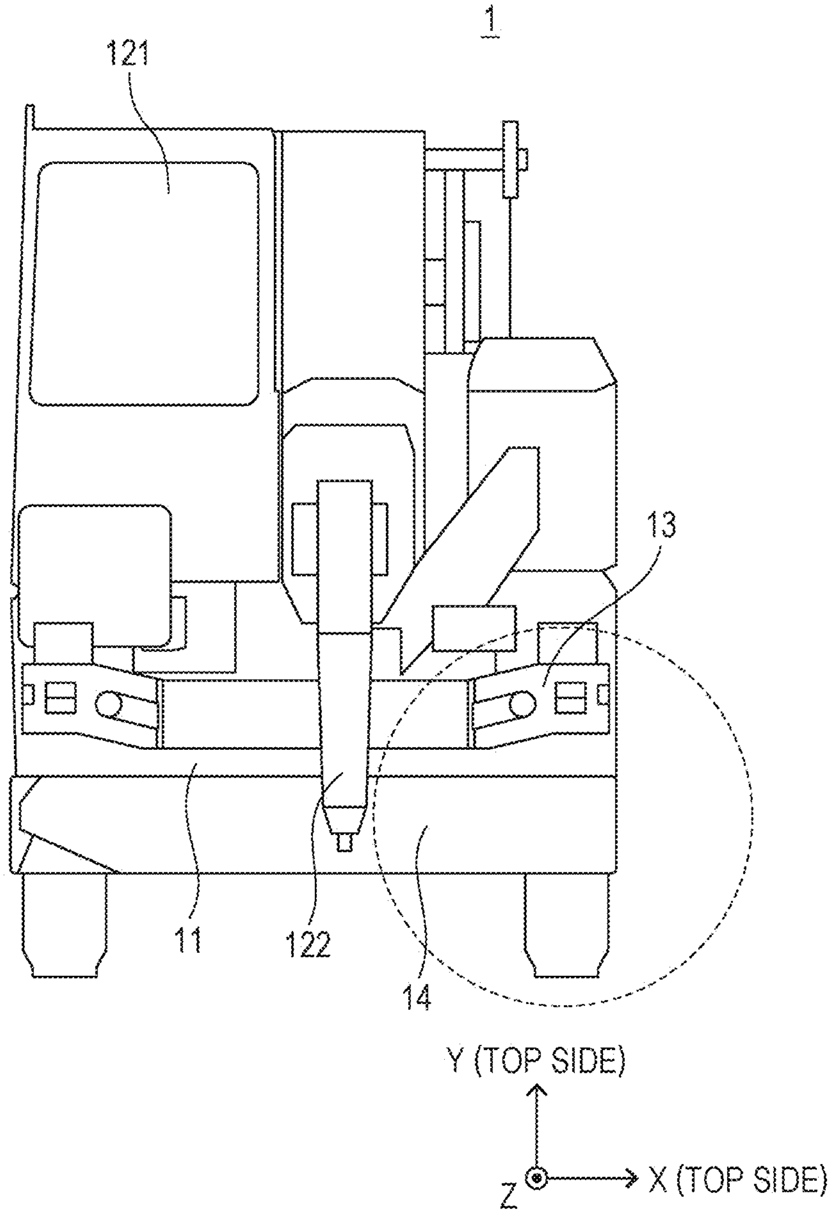
FIG. 2 is a front view of the mobile crane in the form for traveling.

FIGS. 1 and 2 illustrate a mobile crane 1 in a form for traveling allowing traveling with a boom 122 lowered. The mobile crane 1 includes a swivel 12, on which a driver cabin 121 and the boom 122 are mounted, on a vehicle body 11.

The vehicle body 11 corresponds to an exemplary traveling vehicle body and includes a bumper 13 on its front. The vehicle body 11 includes an outrigger 14. The outrigger 14 includes a front outrigger 14 disposed on the front side of the vehicle body 11 and a rear outrigger 14 disposed on the rear side of the vehicle body 11. The front outrigger 14 is provided behind the bumper 13.

The outrigger 14 lowers its leading end to the ground while protruding laterally from the vehicle body 11 before working. As a result, the outrigger 14 raises the vehicle body 11 to stabilize the pose of the mobile crane 1.

The outrigger 14 is stored in the front and rear of the vehicle body 11 in the form for traveling. The mobile crane 1 in the form for traveling travels typically with the boom 122 laid forward as in FIGS. 1 and 2. Therefore, the leading end of the boom 122 is located ahead of the front of the vehicle body 11. In the mobile crane 1 described above, in a case where an ultrasonic sensor is provided to the front of the vehicle body 11, the ultrasonic sensor is likely to detect the boom 122.

Figure 3:
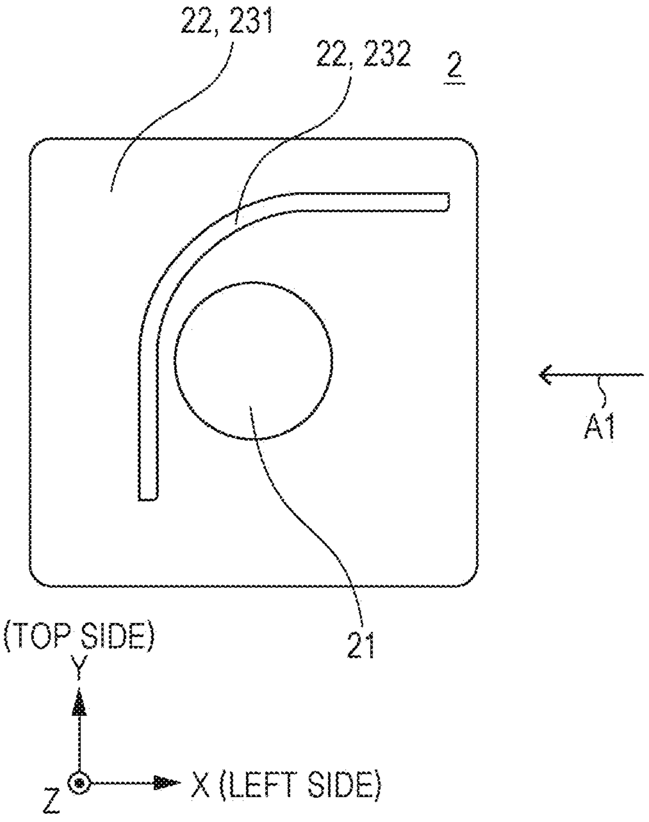
FIG. 3 is a front view of an ultrasonic device in a first embodiment.
Figure 4:
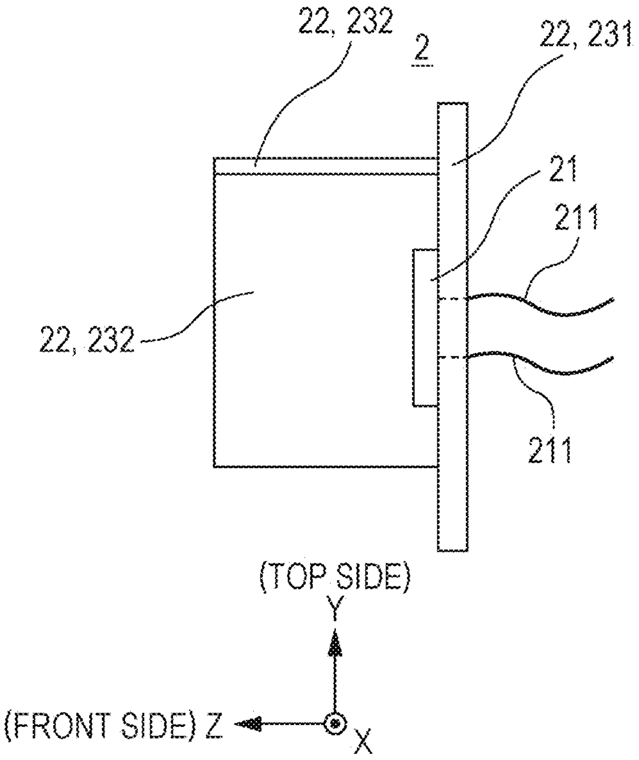
FIG. 4 is a side view of the ultrasonic device in the first embodiment.

Thus, in the present embodiment, used is an ultrasonic device 2 including a shielding member 22 illustrated in FIGS. 3 and 4. FIG. 3 is a front view of the ultrasonic device 2. FIG. 4 is a side view of the ultrasonic device 2, illustrated in FIG. 3, viewed in the direction of an arrow A1 of FIG. 3.

In a Cartesian coordinate system (X, Y, Z) illustrated in FIGS. 3 and 4, the Z direction corresponds to the fore-aft direction of the mobile crane 1. The positive side of the Z direction is identical to the front side (in other words, the direction of forward movement of the mobile crane 1). The negative side of the Z direction is identical to the rear side (in other words, the direction of backward movement of the mobile crane 1).

The Y direction corresponds to the up-down direction of the mobile crane 1. The positive side of the Y direction is identical to the top side. The negative side of the Y direction is identical to the bottom side.

The X direction corresponds to the left-right direction of the mobile crane 1. The positive side of the X direction is identical to the left side in forward viewing from the mobile crane 1. The negative side of the X direction is identical to the right side in forward viewing from the mobile crane 1. Note that the Cartesian coordinate system (X, Y, Z) indicated in every drawing except FIGS. 3 and 4 corresponds to the Cartesian coordinate system (X, Y, Z) indicated in FIGS. 3 and 4.

The negative side of the X direction (right side) with respect to the shielding member 22 corresponds to the side of location of the boom 122. A shielding plate 232 protrudes forward from a rear plate 231 (to the positive side of the Z direction). The rear plate 231 is substantially parallel to the XY plane, and the shielding plate 232 is provided substantially perpendicularly to the XY plane. The shielding plate 232 can be regarded as an exemplary shielding member.

FIGS. 3 and 4 illustrate the ultrasonic device 2, according to the present embodiment, including an ultrasonic sensor 21 and the shielding member 22. The ultrasonic sensor 21 is thin in type and functions to transmit and receive. The ultrasonic sensor 21 is provided on the front of the rear plate 231 of the shielding member 22.

As illustrated in FIG. 3, the shielding plate 232 protruding from the front of the rear plate 231 curves from a lateral side of the ultrasonic sensor 21 to the top side of the ultrasonic sensor 21 and blocks ultrasound.

As illustrated in FIG. 4, wiring 211 for the ultrasonic sensor 21 extends backward (rearward) through a small hole provided to the rear plate 231. The shielding plate 232 serves as a shielding wall that limits the reachable region of the ultrasound from the ultrasonic sensor 21.

Figure 5:
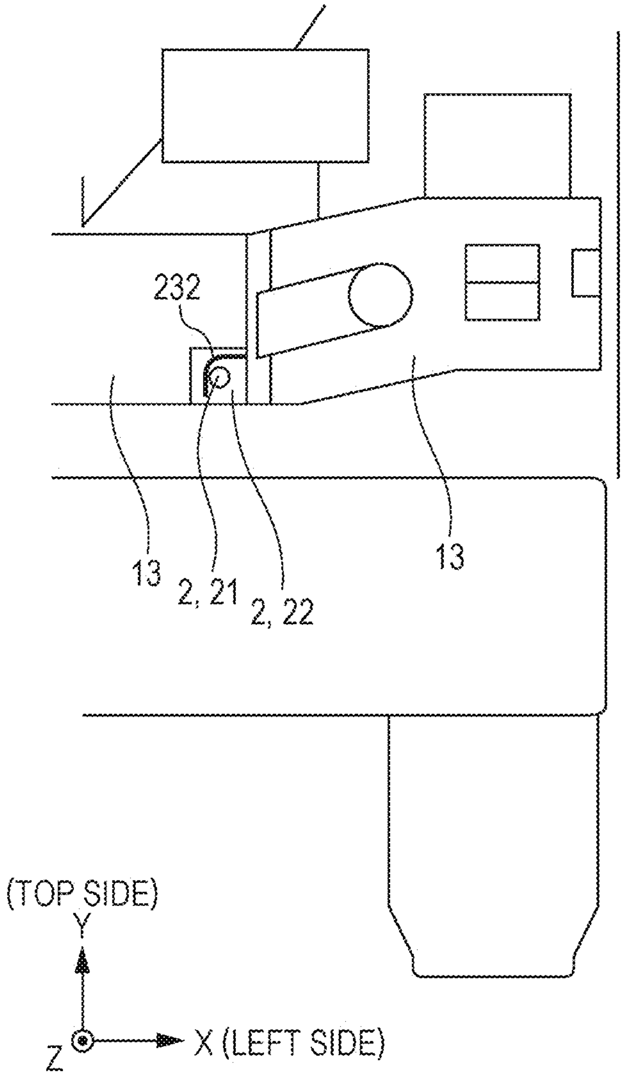
FIG. 5 is a front view of the mobile crane to which the ultrasonic device in the first embodiment is attached.

FIG. 5 illustrates an example in which the ultrasonic device 2 is attached to the front of the bumper 13 of the mobile crane 1. FIG. 5 corresponds to an enlarged view of a portion surrounded with a dotted line of the front of the mobile crane 1 illustrated in FIG. 2.

FIG. 5 is an enlarged view of the left half of the front of the mobile crane 1.

The ultrasonic device 2 corresponds to an exemplary distance detection device, and another ultrasonic device 2 is provided to the right half of the front of the mobile crane 1. Such an ultrasonic device 2 includes an ultrasonic sensor 21 provided on the front side of the vehicle body 11. The ultrasonic device 2 detects the distance between the ultrasonic sensor 21 and a detection object OB ahead of the vehicle body 11 (refer to FIG. 7).

In the present embodiment, the mobile crane 1 includes ultrasonic devices 2 one-to-one on the front right side and front left side of the vehicle body 11. That is, the mobile crane 1 includes a pair of left and right ultrasonic devices 2.

The ultrasonic device 2 provided to the left half of the front of the mobile crane 1 and the ultrasonic device 2 provided to the right half of the front of the mobile crane 1 are bilaterally symmetrical. Such points are also fulfilled in FIGS. 6, 10, and 12 described later.

The wiring 211 for such an ultrasonic sensor 21 is connected to a detection device (not illustrated) through the inside of the bumper 13. The detection device causes the ultrasonic sensor 21 to emit (to transmit) an ultrasonic pulse.

The ultrasonic pulse emitted by the ultrasonic sensor 21 (hereinafter, also referred to as an emitted pulse) returns to the ultrasonic sensor 21 after reflecting off the detection object OB. The ultrasonic sensor 21 receives the returned ultrasonic pulse (hereinafter, also referred to as a received pulse).

Based on the time difference between the emitted pulse and the received pulse (in other words, phase difference), the detection device measures the distance to the detection object OB.

Then, when the distance between the mobile crane 1 and the detection object OB falls below a predetermined valve, a warning is issued in the driver cabin 121 or the mobile crane 1 in traveling is operated to brake.

Although the boom 122 is located diagonally right above the ultrasonic device 2, ultrasound heading for the boom 122 (namely, diagonally right upward ultrasound) is blocked by the shielding plate 232 so as not to reach the boom 122. That is, the ultrasonic device 2 is prevented from detecting the boom 122 accidentally.

Figure 6:
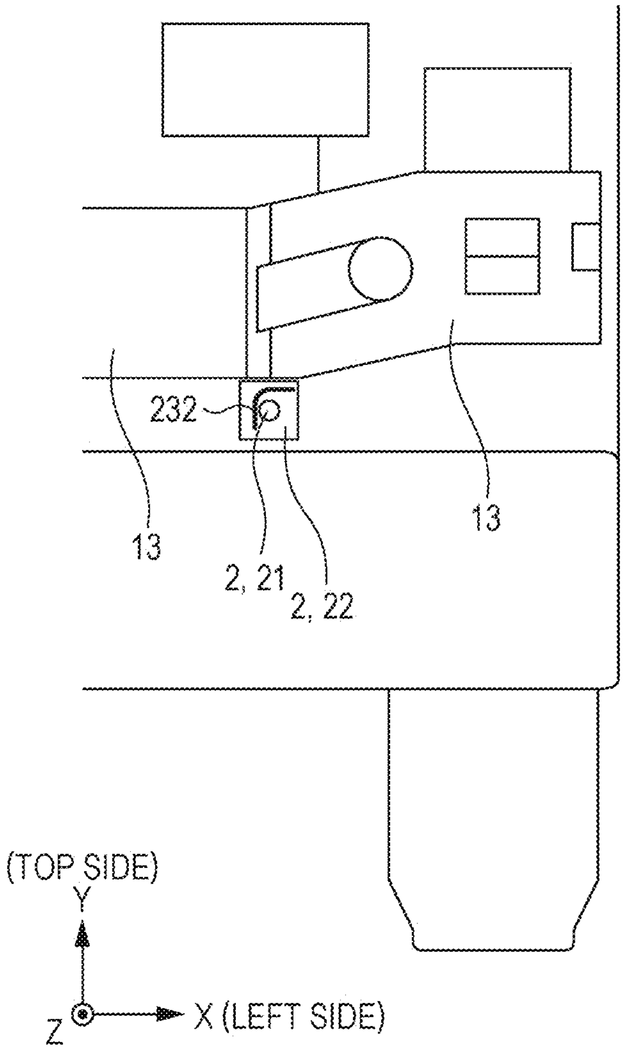
FIG. 6 is a front view of the mobile crane having a bumper under which the ultrasonic device in the first embodiment is attached.

In the present embodiment, as illustrated in FIG. 5, the ultrasonic device 2 is provided on the front of the bumper 13. Note that, as illustrated in FIG. 6, the ultrasonic device 2 may be provided under the bumper 13.

As a configuration, the ultrasonic device 2 can be provided under the bumper 13 such that the shielding plate 232 does not protrude forward from the bumper 13. The ultrasonic device 2 may be embedded in the bumper 13. As a configuration, the ultrasonic device 2 can be embedded in the bumper 13 such that the body of a worker is inhibited from hitting against the shielding plate 232 at the time of crane preparation. The shielding plate 232 may be in a conical shape open on its left side opposite to the side of location of the boom 122.

Second Embodiment

Next, an ultrasonic device 3 mounted on a mobile crane according to a second embodiment of the present invention will be described (refer to FIG. 8). The ultrasonic device 3 according to the present embodiment serves as an ultrasonic device to which a so-called crossing detection method is applied. The ultrasonic device 3 includes a first ultrasonic sensor 31 and a second ultrasonic sensor 32.

Figure 7:
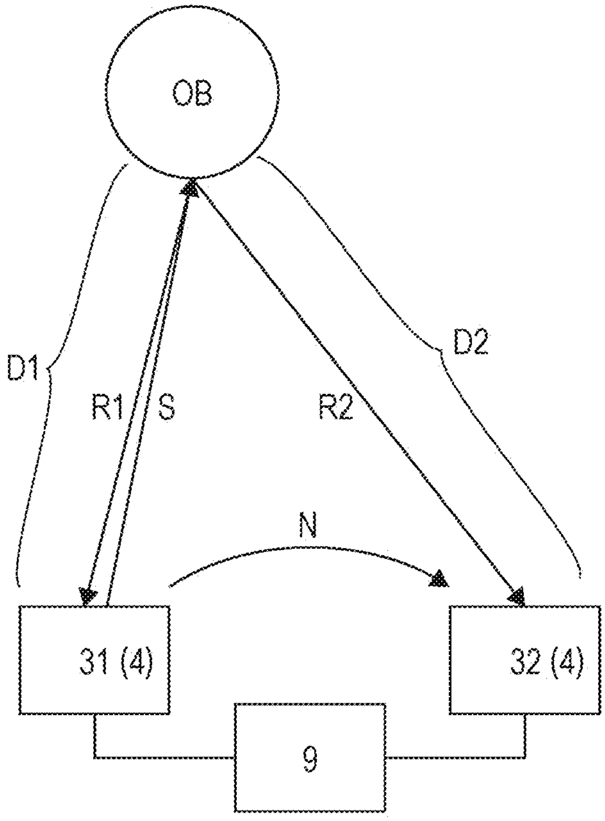
FIG. 7 is an explanatory diagram for a crossing detection method.

The crossing detection method will be now described with FIG. 7. A plurality of ultrasonic sensors is used in the method. The first ultrasonic sensor 31 and the second ultrasonic sensor 32 illustrated in FIG. 7 each have a function to emit ultrasound (hereinafter, also referred to as an ultrasonic emission function) and a function to receive ultrasound (hereinafter, also referred to as an ultrasonic reception function).

A detection device 9 performs ultrasonic emission control and additionally performs computing and control based on reception information. The detection device 9 may be achieved with a computer.

As illustrated in FIG. 7, the first ultrasonic sensor 31 emits ultrasound S. In addition, the first ultrasonic sensor 31 receives a reflected wave R1. The reflected wave R1 is ultrasound resulting from reflection of the ultrasound S off a detection object OB. The second ultrasonic sensor 32 receives a reflected wave R2. The reflected wave R2 is ultrasound resulting from reflection of the ultrasound S off the detection object OB. As above, a detection method in which the first ultrasonic sensor 31 emits ultrasound S and then the first ultrasonic sensor 31 receives a reflected wave R1 and the second ultrasonic sensor 32 receives a reflected wave R2 is referred to as first detection.

In addition, although not illustrated, a detection method in which the second ultrasonic sensor 32 emits ultrasound S and then the first ultrasonic sensor 31 receives a reflected wave R1 of the ultrasound S and the second ultrasonic sensor 32 receives a reflected wave R2 of the ultrasound S is referred to as second detection. The detection device 9 performs the first detection and the second detection, repeatedly.

FIG. 7 illustrates how the first detection is performed. The detection device 9 issues a command to the first ultrasonic sensor 31, and then the first ultrasonic sensor 31 emits ultrasound S. The ultrasound S emitted by the first ultrasonic sensor 31 reflects off the detection object OB to cause a reflected wave R1 and a reflected wave R2.

Then, the first ultrasonic sensor 31 receives the reflected wave R1. In addition, the second ultrasonic sensor 32 receives the reflected wave R2.

The detection device 9 receives information regarding the reflected wave R1 from the first ultrasonic sensor 31 and receives information regarding the reflected wave R2 from the second ultrasonic sensor 32. Then, based on the time difference between the time when the ultrasound S is emitted by the first ultrasonic sensor 31 and the time when the reflected wave R1 is received by the first ultrasonic sensor 31, the detection device 9 calculates the distance D1 from the first ultrasonic sensor 31 to the detection object OB.

In other words, based on the time taken for the first ultrasonic sensor 31 to receive the reflected wave R1 after emission of the ultrasound S by the first ultrasonic sensor 31, the detection device 9 calculates the distance D1 from the first ultrasonic sensor 31 to the detection object OB.

Furthermore, based on the time difference between the time when the ultrasound S is emitted by the first ultrasonic sensor 31 and the time when the reflected wave R2 is received by the second ultrasonic sensor 32 and the distance D1, the detection device 9 calculates the distance D2 from the second ultrasonic sensor 32 to the detection object OB.

In other words, based on the time taken for the second ultrasonic sensor 32 to receive the reflected wave R2 after emission of the ultrasound S by the first ultrasonic sensor 31 and the distance D1, the detection device 9 calculates the distance D2 from the second ultrasonic sensor 32 to the detection object OB.

Then, based on the distance D1, the distance D2, and the respective positions of the first ultrasonic sensor 31 and the second ultrasonic sensor 32, the detection device 9 calculates the position of the detection object OB.

When detecting that the position of the detection object OB is in a danger area, the detection device 9 sends an alarm signal to an alarm device (not illustrated), so that an audible alarm is generated inside a driver cabin 121.

Furthermore, the detection device 9 sends a brake signal to a brake detection device (not illustrated), so that the mobile crane 1 during traveling is braked by automatic braking.

Under the second detection, the second ultrasonic sensor 32 emits ultrasound S and then the first ultrasonic sensor 31 and the second ultrasonic sensor 32 receive, respectively, a reflected wave R1 and a reflected wave R2. In the present embodiment, the detection device 9 performs the first detection and the second detection, alternately and repeatedly, to detect the position of the detection object OB.

As described above, under the first detection and the second detection, used are the reflected wave R1 and the reflected wave R2 from the detection object OB. In such a detection method as above, as indicated with a curved arrow in FIG. 7, if the second ultrasonic sensor 32 receives a direct wave N from the ultrasound S emitted by the first ultrasonic sensor 31, the direct wave N is likely to cause noise in detection of the position of the detection object OB.

Figure 8:
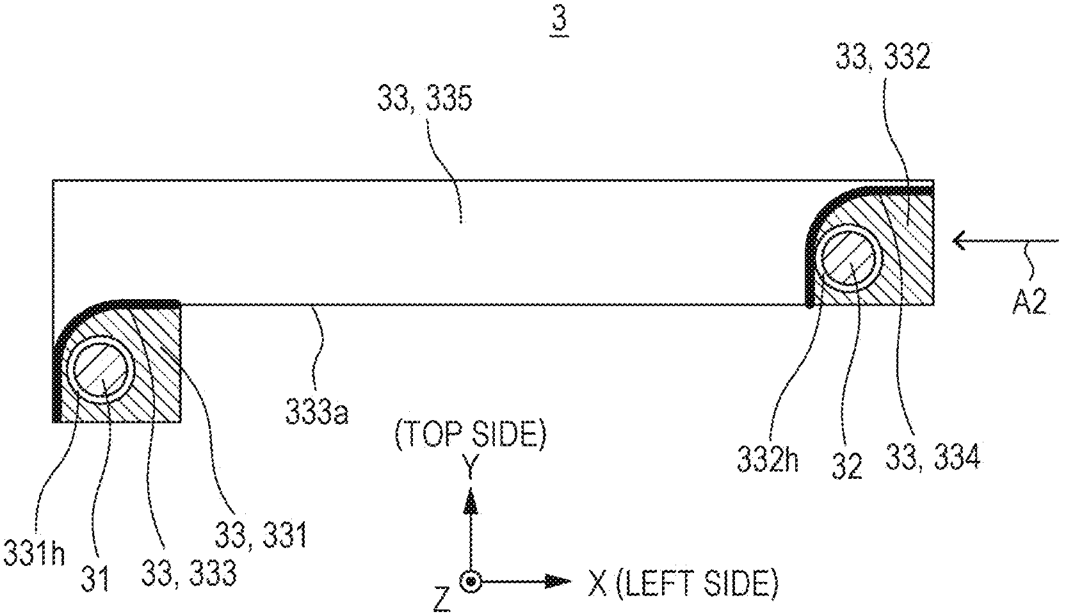
FIG. 8 is a front view of an ultrasonic device in a second embodiment.
Figure 9:
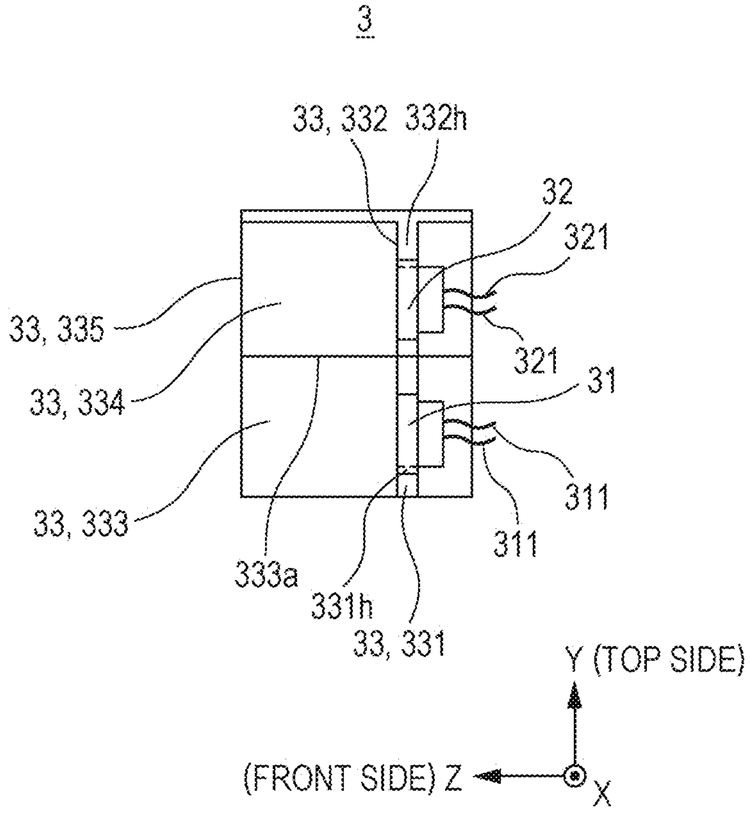
FIG. 9 is a side view of the ultrasonic device in the second embodiment.

Thus, in the present embodiment, as illustrated in FIGS. 8 and 9, a shielding member 33 is provided between the first ultrasonic sensor 31 and the second ultrasonic sensor 32.

FIG. 8 is a front view of the ultrasonic device 3 according to the present embodiment. FIG. 9 is a side view of the ultrasonic device 3, illustrated in FIG. 8, viewed in the direction of an arrow A2 of FIG. 8. A boom 122 (refer to FIG. 2) is provided on the right side (on the negative side of the X direction) of the shielding member 33.

The shielding member 33 includes a first rear plate 331, a second rear plate 332, a front plate 335, a first shielding plate 333, and a second shielding plate 334.

The first rear plate 331 and the second rear plate 332 are disposed in alignment in the fore-aft direction. The front plate 335 is disposed ahead of the first rear plate 331 and the second rear plate 332. The front plate 335 serves as a plate-shaped member that extends in the left-right direction and is parallel to the XY plane.

The first shielding plate 333 corresponds to an exemplary shielding member and an exemplary first shielding member and connects the front plate 335 and the first rear plate 331 in the fore-aft direction. The second shielding plate 334 connects the front plate 335 and the second rear plate 332 in the fore-aft direction. The first shielding plate 333 and the second shielding plate 334 are each substantially perpendicular to the XY plane.

The first shielding plate 333 is provided between the boom 122 in a state allowing traveling (refer to FIG. 2) and the first ultrasonic sensor 31. Referring to FIG. 8, the first shielding plate 333 is a portion that is indicated in a bold manner and is denoted with 333 as a reference sign. The first shielding plate 333 is almost similar in shape to the shielding member 22 illustrated in FIGS. 3 and 4.

The first shielding plate 333 blocks ultrasound that the first ultrasonic sensor 31 emits. Specifically, the first shielding plate 333 blocks ultrasound that heads for the boom 122 and is part of the ultrasound emitted from the first ultrasonic sensor 31.

The second shielding plate 334 corresponds to an exemplary second shielding member and is provided between the boom 122 in the state allowing traveling (refer to FIG. 2) and the second ultrasonic sensor 32. Referring to FIG. 8, the second shielding plate 334 is a portion that is indicated in a bold manner and is denoted with 334 as a reference sign. The second shielding plate 334 is almost similar in shape to the shielding member 22 illustrated in FIGS. 3 and 4.

The second shielding plate 334 blocks ultrasound that the second ultrasonic sensor 32 emits. Specifically, the second shielding plate 334 blocks ultrasound that heads for the boom 122 and is part of the ultrasound emitted from the second ultrasonic sensor 32.

The first rear plate 331 is provided with a first sensor hole 331*h*. The first ultrasonic sensor 31 is attached to the first sensor hole 331*h*.

The second rear plate 332 is provided with a second sensor hole 332*h*. The second ultrasonic sensor 32 is attached to the second sensor hole 332*h*.

The first ultrasonic sensor 31 is provided closer to the boom 122 than the second ultrasonic sensor 32 is. In other words, the second ultrasonic sensor 32 is provided further from the boom 122 than the first ultrasonic sensor 31 is.

As illustrated in FIG. 9, wiring 311 for the first ultrasonic sensor 31 extends backward from the first ultrasonic sensor 31. Wiring 321 for the second ultrasonic sensor 32 extends backward from the second ultrasonic sensor 32.

The first shielding plate 333 curves from the right side to top side of the first sensor hole 331*h*. The second shielding plate 334 curves from the right side to top side of the second sensor hole 332*h*.

The first shielding plate 333 and the second shielding plate 334 are connected in the left-right direction through a shielding-plate upper face 333*a*. The shielding-plate upper face 333*a* serves as a plate-shaped member that extends in the left-right direction and is parallel to the XZ plane. The first shielding plate 333 is provided lower than the second shielding plate 334. The shielding-plate upper face 333*a* corresponds to an exemplary third shielding member.

The first shielding plate 333 serves as a shielding wall that limits the reachable region of the ultrasound emitted by the first ultrasonic sensor 31. The second shielding plate 334 serves as a shielding wall that limits the reachable region of the ultrasound emitted by the second ultrasonic sensor 32.

The ultrasound emitted by the first ultrasonic sensor 31 does not reach the boom 122 due to blocking by the first shielding plate 333. The ultrasound emitted by the second ultrasonic sensor 32 does not reach the boom 122 due to blocking by the second shielding plate 334.

The first sensor hole 331*h* is provided lower than the second sensor hole 332*h*. Then, the shielding-plate upper face 333*a* and the second shielding plate 334 are provided between the first sensor hole 331*h* and the second sensor hole 332*h*. Thus, the direct wave N from the ultrasound emitted by the first ultrasonic sensor 31 (refer to FIG. 7) does not reach the second ultrasonic sensor 32 due to blocking by the shielding-plate upper face 333*a* and the second shielding plate 334.

Figure 10:
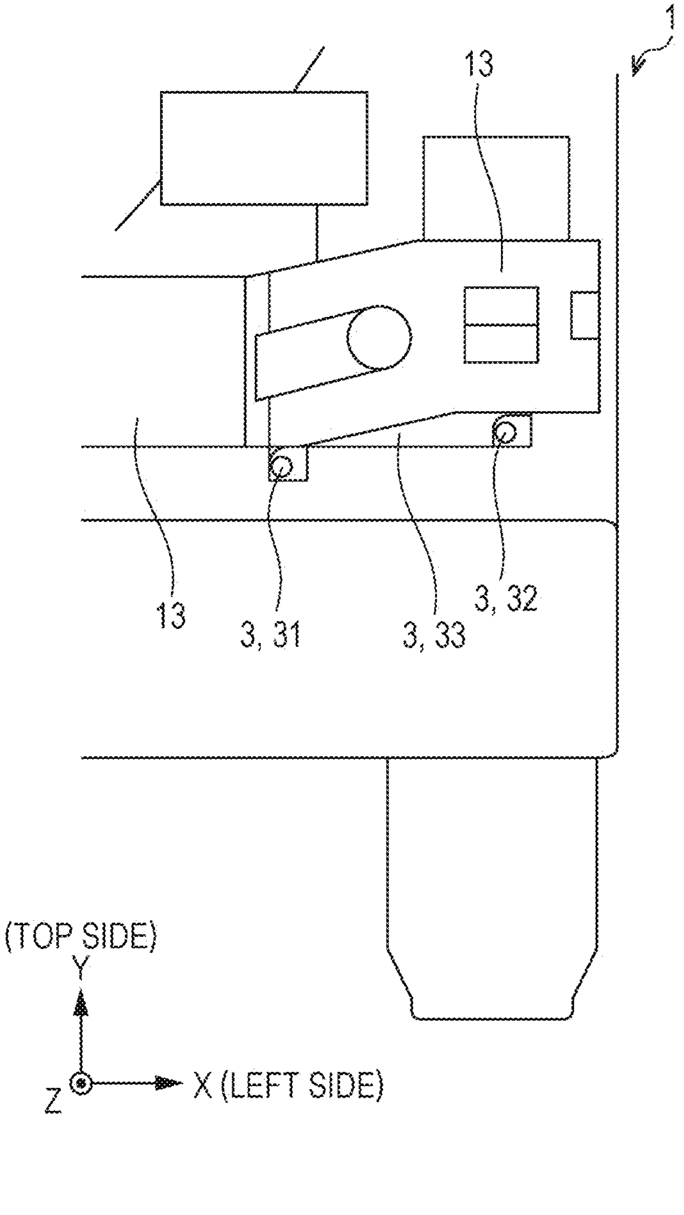
FIG. 10 is a front view of a mobile crane to which the ultrasonic device in the second embodiment is attached.

The ultrasonic device 3 according to the present embodiment with such a configuration as above is attached to the mobile crane 1 in such a state as illustrated in FIG. 10. Specifically, the ultrasonic device 3 is provided on the bottom side of the bumper 13 of the vehicle body 11.

As illustrated in FIG. 10, part of the shielding member 33 is hidden behind the bumper 13. In other words, the bumper 13 covers part of the shielding member 33 from the front.

In FIG. 10, the boom 122 is located diagonally right above the ultrasonic device 3. The ultrasound S emitted from the first ultrasonic sensor 31 does not reach the boom 122 due to blocking by the shielding member 33 (specifically, due to blocking by the first shielding plate 333).

The ultrasound S emitted from the second ultrasonic sensor 32 does not reach the boom 122 due to blocking by the shielding member 33 (specifically, due to blocking by the second shielding plate 334).

The direct wave N from the ultrasound emitted by the first ultrasonic sensor 31 (refer to FIG. 7) does not reach the second ultrasonic sensor 32 due to blocking by the shielding member 33 (specifically, due to blocking by the shielding-plate upper face 333*a* and the second shielding plate 334). The shielding-plate upper face 333*a* and the second shielding plate 334 can be regarded as an exemplary third shielding member.

Meanwhile, ultrasound that heads for the detection object OB located ahead of the mobile crane 1 (refer to FIG. 7) and is part of the ultrasound S emitted from the first ultrasonic sensor 31 reaches the detection object OB without being blocked by the shielding member 33.

Then, the ultrasound S reflects off the detection object OB to cause a reflected wave R1 and a reflected wave R2 (refer to FIG. 7). The reflected wave R1 is received by the first ultrasonic sensor 31 without being blocked by the shielding member 33. The reflected wave R2 is received by the second ultrasonic sensor 32 without being blocked by the shielding member 33.

Note that the above description has given the ultrasonic device 3 provided to the left half of the front of the mobile crane 1 (hereinafter, also referred to as a left ultrasonic device 3).

The mobile crane 1 according to the present embodiment includes another ultrasonic device 3, similar in configuration to the left ultrasonic device 3, on the right half of its front (right ultrasonic device 3). The left ultrasonic device 3 and the right ultrasonic device 3 are bilaterally symmetrical. Mobile cranes according to the following embodiments each have such a configuration as above.

<Modification 1>

Figure 11:
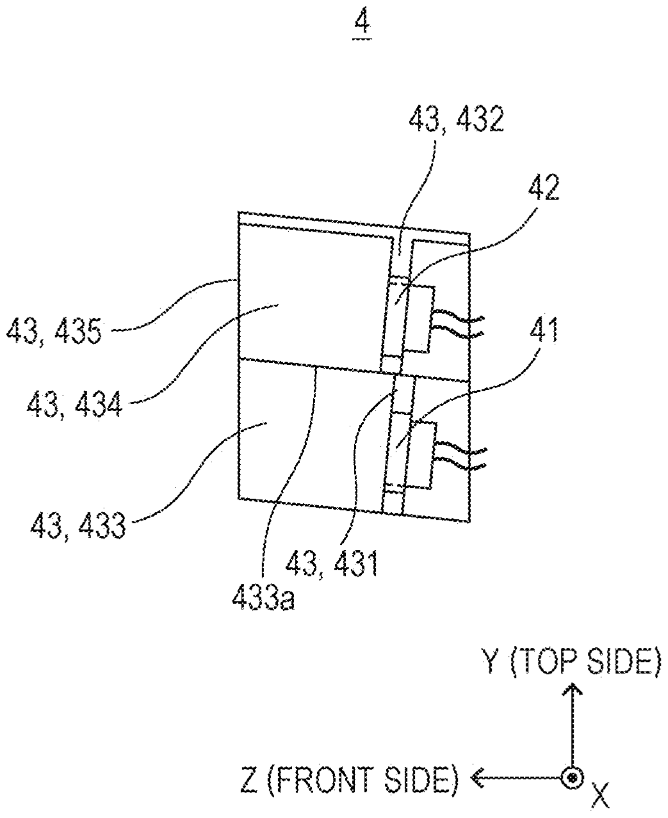
FIG. 11 is a side view of an ultrasonic device in Modification 1.

FIG. 11 is a side view of an ultrasonic device 4 according to Modification 1 of the second embodiment. A front view of the ultrasonic device 4 according to Modification 1 is almost similar to FIG. 8 that is a front view of the ultrasonic device 3 according to the second embodiment.

A shielding member 43 in Modification 1 is similar in configuration to the shielding member 33, according to the second embodiment, inclined. Specifically, the shielding member 43 inclines such that a front end portion is located higher than a rear end portion.

More specifically, a first ultrasonic sensor 41, a second ultrasonic sensor 42, a first rear plate 431, a second rear plate 432, a first shielding plate 433, a shielding-plate upper face 433*a*, and a second shielding plate 434 incline such that the front end portion is higher than the rear end portion.

Note that a front plate 435 does not incline. Such formation as above enables detection of a detection object OB located slightly higher even with the ultrasonic device 4 disposed under a bumper 13.

<Modification 2>

Figure 12:
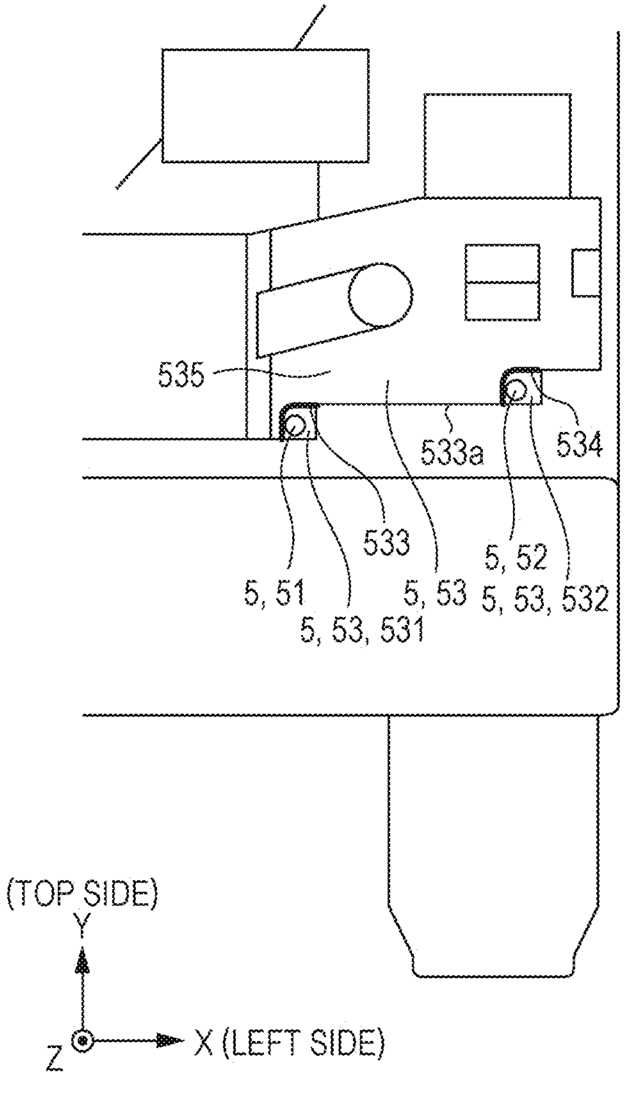
FIG. 12 is a front view of a mobile crane to which an ultrasonic device in Modification 2 is attached.

FIG. 12 is a front view of an ultrasonic device 5 according to Modification 2 of the second embodiment. For the ultrasonic device 5 in Modification 2, used is a shielding bumper 53 that is a shielding wall formed with a bumper.

The shielding bumper 53 is made of metal or resin. The shielding bumper 53 includes a first sensor hole (not illustrated) for supporting a first ultrasonic sensor 51 and a second sensor hole (not illustrated) for supporting a second ultrasonic sensor 52.

In a state allowing traveling, a boom 122 (refer to FIG. 2) is located diagonally right above the first ultrasonic sensor 51 and the second ultrasonic sensor 52.

The shielding bumper 53 includes a first rear plate 531 and a second rear plate 532. The first rear plate 531 and the second rear plate 532 are provided in alignment in the fore-aft direction.

The shielding bumper 53 further includes a first shielding plate 533 and a second shielding plate 534. The first shielding plate 533 and the second shielding plate 534 correspond to an exemplary shielding member.

The first shielding plate 533 is substantially perpendicular to the XY plane. The first shielding plate 533 connects, in the fore-aft direction, a front plate 535 and the first rear plate 531 of the shielding bumper 53. The first shielding plate 533 is provided between the boom 122 in the state allowing traveling (refer to FIG. 2) and the first ultrasonic sensor 51. Referring to FIG. 12, the first shielding plate 533 is a portion that is indicated in a bold manner and is denoted with 533 as a reference sign. The first shielding plate 533 is almost similar in shape to the shielding member 22 illustrated in FIGS. 3 and 4.

The first shielding plate 533 blocks ultrasound that the first ultrasonic sensor 51 emits. Specifically, the first shielding plate 533 blocks ultrasound that heads for the boom 122 and is part of the ultrasound emitted from the first ultrasonic sensor 51.

The second shielding plate 534 is substantially perpendicular to the XY plane. The second shielding plate 534 connects, in the fore-aft direction, the front plate 535 and the second rear plate 532 of the shielding bumper 53. The second shielding plate 534 is provided between the boom 122 in the state allowing traveling (refer to FIG. 2) and the second ultrasonic sensor 52. Referring to FIG. 12, the second shielding plate 534 is a portion that is indicated in a bold manner and is denoted with 534 as a reference sign. The second shielding plate 534 is almost similar in shape to the shielding member 22 illustrated in FIGS. 3 and 4.

The second shielding plate 534 blocks ultrasound that the second ultrasonic sensor 52 emits. Specifically, the second shielding plate 534 blocks ultrasound that heads for the boom 122 and is part of the ultrasound emitted from the second ultrasonic sensor 52.

The first rear plate 531 is provided with the first sensor hole. The first ultrasonic sensor 51 is attached to the first sensor hole. The second rear plate 532 is provided with the second sensor hole. The second ultrasonic sensor 52 is attached to the second sensor hole.

The first ultrasonic sensor 51 is provided closer to the boom 122 than the second ultrasonic sensor 52 is. In other words, the second ultrasonic sensor 52 is provided further from the boom 122 than the first ultrasonic sensor 51 is.

Wiring (not illustrated) for the first ultrasonic sensor 51 extends backward from the first ultrasonic sensor 51. Wiring (not illustrated) for the second ultrasonic sensor 52 extends backward from the second ultrasonic sensor 52.

The first shielding plate 533 and the second shielding plate 534 are connected in the left-right direction through a shielding-plate upper face 533*a*. The shielding-plate upper face 333*a* serves as a plate-shaped member that extends in the left-right direction and is parallel to the XZ plane. The first shielding plate 333 is provided lower than the second shielding plate 334. The shielding-plate upper face 533*a* corresponds to an exemplary third shielding member.

The first shielding plate 533 serves as a shielding wall that limits the reachable region of the ultrasound emitted by the first ultrasonic sensor 51. The second shielding plate 534 serves as a shielding wall that limits the reachable region of the ultrasound emitted by the second ultrasonic sensor 52.

The ultrasound emitted by the first ultrasonic sensor 51 does not reach the boom 122 due to blocking by the first shielding plate 533. The ultrasound emitted by the second ultrasonic sensor 52 does not reach the boom 122 due to blocking by the second shielding plate 534.

The first ultrasonic sensor 51 is provided lower than the second ultrasonic sensor 52. Then, the shielding-plate upper face 333*a* and the second shielding plate 334 are provided between the first ultrasonic sensor 51 and the second ultrasonic sensor 52. Thus, a direct wave N (refer to FIG. 7) from the ultrasound emitted by the first ultrasonic sensor 51 does not reach the second ultrasonic sensor 32 due to blocking by the shielding-plate upper face 533*a* and the second shielding plate 534. The shielding-plate upper face 333*a* and the second shielding plate 334 can be regarded as an exemplary third shielding member.

<Modification 3>

Figure 13:
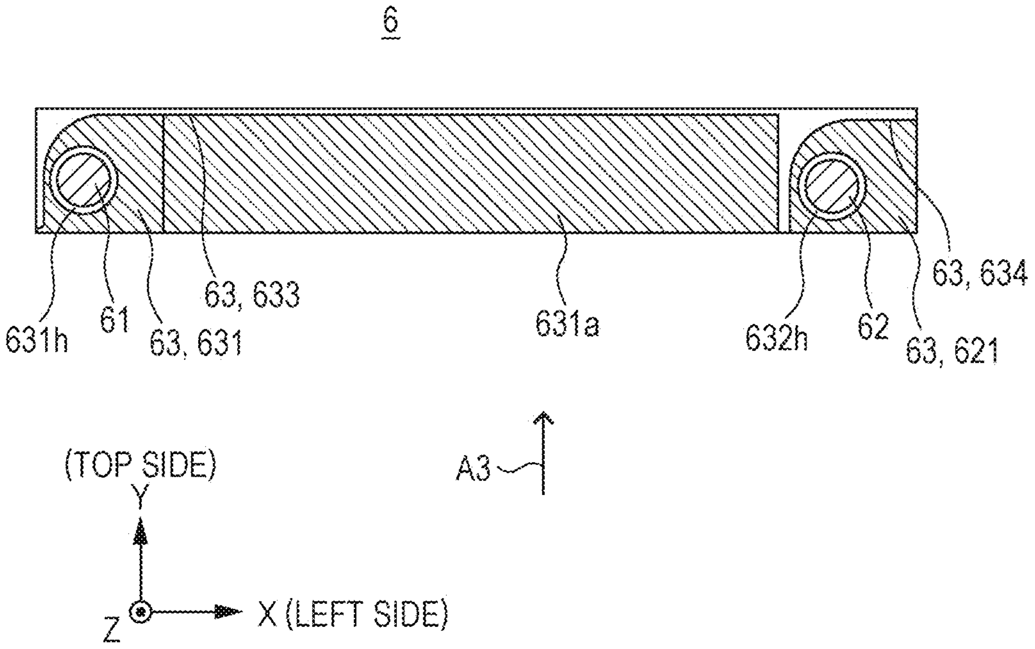
FIG. 13 is a front view of an ultrasonic device in Modification 3.
Figure 14:
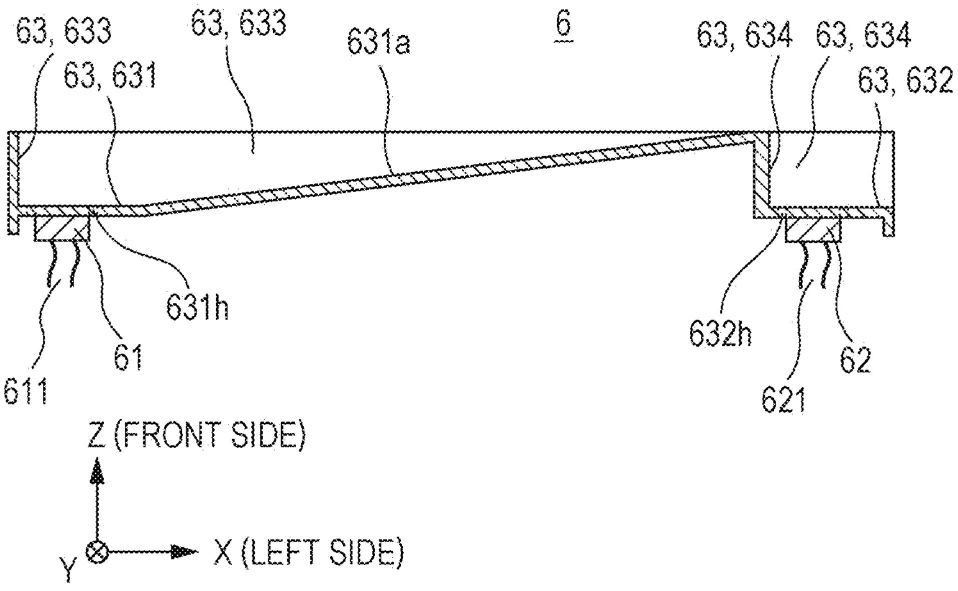
FIG. 14 is a bottom view of the ultrasonic device in Modification 3.

FIG. 13 is a front view of an ultrasonic device 6 according to Modification 3 of the second embodiment. FIG. 14 is a bottom view of the ultrasonic device 6 viewed in the direction of an arrow A3 of FIG. 13.

In the present modification, as illustrated in FIG. 13, a first ultrasonic sensor 61 and a second ultrasonic sensor 62 are provided at the same height. A first sensor hole 631*h* and a second sensor hole 632*h* are provided at the same height.

In a state allowing traveling, a boom 122 (refer to FIG. 2) is located on the right side of the first ultrasonic sensor 51 and the second ultrasonic sensor 52. A first rear plate 631 and a second rear plate 632 are provided in alignment in the fore-aft direction.

The first rear plate 631 and a second shielding plate 634 are connected in the left-right direction through an inclined plate 631*a*. The inclined plate 631*a* inclines such that the inclined plate 631*a* is located further ahead as closer to the second shielding plate 634 (in other words, as further from the boom 122). The inclined plate 631*a* corresponds to an exemplary third shielding member. A first shielding plate 633 and the second shielding plate 634 are substantially perpendicular to the XY plane.

The first rear plate 631 is provided with the first sensor hole 631*h*. The first ultrasonic sensor 61 is attached to the first sensor hole 631*h*. The second rear plate 632 is provided with the second sensor hole 632*h*. The second ultrasonic sensor 62 is attached to the second sensor hole 632*h*.

The first ultrasonic sensor 61 is provided closer to the boom 122 than the second ultrasonic sensor 62 is. In other words, the second ultrasonic sensor 62 is provided further from the boom 122 than the first ultrasonic sensor 61 is.

As illustrated in FIG. 14, wiring 611 for the first ultrasonic sensor 61 extends backward from the first ultrasonic sensor 61. Wiring 621 for the second ultrasonic sensor 62 extends backward from the second ultrasonic sensor 62.

The first shielding plate 633 curves from the right side to top side of the first sensor hole 631*h*. The second shielding plate 634 curves from the right side to top side of the second sensor hole 632*h*.

The first shielding plate 633, the second shielding plate 634, and the inclined plate 631*a* serve as a shielding wall that limits the reachable region of the ultrasound emitted by the first ultrasonic sensor 61 or the second ultrasonic sensor 62.

In the present modification, the inclined plate 631*a* and the second shielding plate 634 are provided between the first ultrasonic sensor 61 and the second ultrasonic sensor 62. Thus, a direct wave N (refer to FIG. 7) from the ultrasound emitted by the first ultrasonic sensor 61 does not reach the second ultrasonic sensor 62 due to blocking by the inclined plate 631*a* and the second shielding plate 634. Note that the ultrasonic device 6 in the present modification may incline like the ultrasonic device 5 according to Modification 2 described above (refer to FIG. 12).

<Modification 4>

Figure 15:
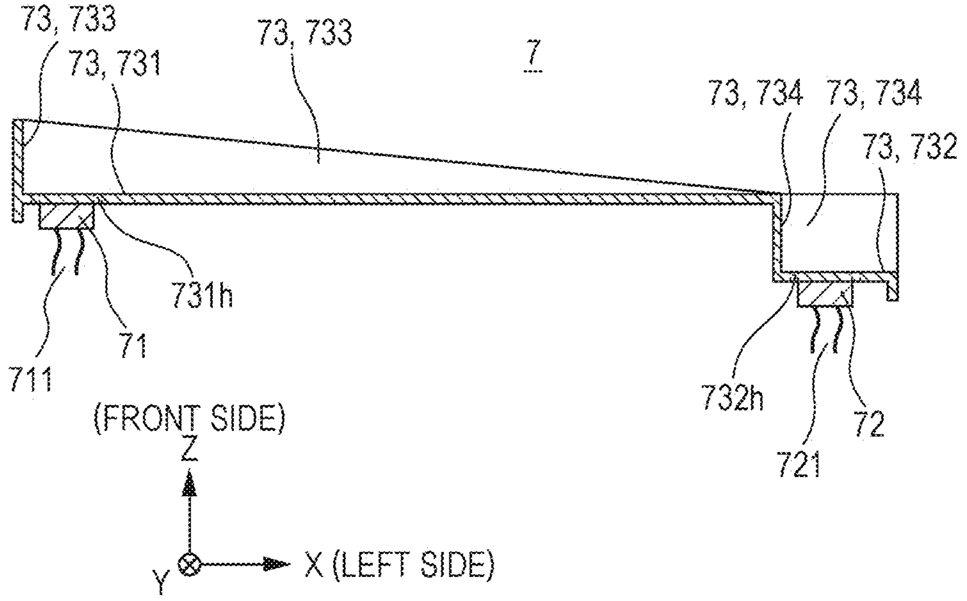
FIG. 15 is a bottom view of an ultrasonic device in Modification 4.

FIG. 15 is a bottom view of an ultrasonic device 7 according to Modification 4 of the second embodiment. The ultrasonic device 7 in the present modification includes a first ultrasonic sensor 71 and a second ultrasonic sensor 72 that are provided at different positions in the fore-aft direction.

In the present modification, a first sensor hole 731*h* and a second sensor hole 732*h* are provided at the same height. Thus, the first ultrasonic sensor 71 and the second ultrasonic sensor 72 are provided at the same height.

In a state allowing traveling, a boom 122 (refer to FIG. 2) is located on the right side of the first ultrasonic sensor 71 and the second ultrasonic sensor 72. A first rear plate 731 is provided ahead of a second rear plate 732. The first rear plate 731 that is plate-shaped is parallel to the XY plane and extends in the left-right direction.

The first rear plate 731 that is plate-shaped is flat. The first rear plate 731 has a left end portion (in other words, an end portion further from the boom 122) connected to a second shielding plate 734. A first shielding plate 733 and the second shielding plate 734 are substantially perpendicular to the XY plane.

The first rear plate 731 is provided with the first sensor hole 731*h*. The first ultrasonic sensor 71 is attached to the first sensor hole 731*h*. The second rear plate 732 is provided with the second sensor hole 732*h*. The second ultrasonic sensor 72 is attached to the second sensor hole 732*h*.

Wiring 711 for the first ultrasonic sensor 71 extends backward from the first ultrasonic sensor 71. Wiring 721 for the second ultrasonic sensor 72 extends backward from the second ultrasonic sensor 72.

The first shielding plate 733 curves from the right side to top side of the first ultrasonic sensor 71. The first shielding plate 733 blocks ultrasound that heads for the boom 122 from the first ultrasonic sensor 71 and is part of the ultrasound emitted by the first ultrasonic sensor 71. Note that the basic shape of the first shielding plate 733 is almost similar to the shape of the shielding member 22 illustrated in FIGS. 3 and 4.

The second shielding plate 734 curves from the right side to top side of the second ultrasonic sensor 72. The second shielding plate 734 blocks ultrasound that heads for the boom 122 from the second ultrasonic sensor 72 and is part of the ultrasound emitted by the second ultrasonic sensor 72. Note that the second shielding plate 734 is almost similar in shape to the shielding member 22 illustrated in FIGS. 3 and 4.

In the present modification, the first rear plate 731 and the second shielding plate 734 are provided between the first ultrasonic sensor 71 and the second ultrasonic sensor 72. The first rear plate 731 and the second shielding plate 734 can be regarded as an exemplary third shielding member. Thus, a direct wave N (refer to FIG. 7) from the ultrasound emitted by the first ultrasonic sensor 71 does not reach the second ultrasonic sensor 32 due to blocking by the first rear plate 731 and the second shielding plate 734.

Note that the ultrasonic device 7 in the present modification may incline like the ultrasonic device 5 according to Modification 2 described above (refer to FIG. 12).

<Supplementary Notes>

Made may be any appropriate combination of the configuration of the ultrasonic device 2 according to the first embodiment described above and the respective configurations of the ultrasonic devices 3 to 7 according to the second embodiment and Modifications 1 to 4 described above.

A shielding member is not limited in shape to the shielding members in the first and second embodiments and Modifications 1 to 4 described above. A shielding member may have any shape, provided that the shielding member can be provided between a boom in a state allowing traveling and an ultrasonic sensor and can block ultrasound that heads for the boom and is part of the ultrasound emitted by the ultrasonic sensor.

For example, a shielding member may include a plurality of plate-shaped members fixed by fixing means, such as welding. For example, the shielding plate 232 illustrated in FIG. 2 may include a side plate that is a plate-shaped member parallel to the ZY plane and an upper plate that is a plate-shaped member parallel to the XY plane, in which the side plate and the upper plate are connected together. In this case, the side plate is disposed on the right side of the ultrasonic sensor 21 and covers the ultrasonic sensor 21 from the right side. The upper plate is disposed on the top side of the ultrasonic sensor 21 and covers the ultrasonic sensor 21 from above.

A routing aspect of wiring connecting an ultrasonic sensor and a detection device is not limited to the cases described above. Wiring for an ultrasonic sensor may extend leftward or rightward from the ultrasonic sensor or may extend upward or downward from the ultrasonic sensor.

Every mobile crane described above includes a left ultrasonic device and a right ultrasonic device disposed in bilateral symmetry. Note that the left ultrasonic device and the right ultrasonic device may be disposed in bilateral asymmetry.

A mobile crane is required to include at least either a left ultrasonic device or a right ultrasonic device. For a mobile crane including a single ultrasonic device, preferably, the ultrasonic device is provided to the vehicle front on the side on which the boom is located with respect to the driver cabin.

The ultrasonic device 3 according to the second embodiment described above (refer to FIG. 8) includes the first rear plate 331 and the second rear plate 332 provided at the same position in the fore-aft direction. Note that the first rear plate 331 and the second rear plate 332 may be provided at different positions in the fore-aft direction. The first shielding plate 333 and the second shielding plate 334 may be each at an angle to the XY plane, instead of being substantially perpendicular to the XY plane. The shielding plate 232 in the first embodiment may also be at an angle to the XY plane.

As a detector, such as an ultrasonic sensor, used can be various detectors, such as a thin detector and a thick detector. As wiring for two detectors, a detection device may be connected to one of the two detectors and the one may be connected to the other. The embodiments and the modifications each describe a rough terrain crane to which the present invention is applied. However, the present invention can be applied to any travelable crane.

In addition, the specific configurations in the embodiments are not limiting and thus alterations in design without departing from the gist of the present invention are to be included in the present invention. The embodiments described above can be combined by using the respective techniques, provided that, for example, there is no particular inconsistency in or no particular problem for the object and configuration.

INDUSTRIAL APPLICABILITY

The present invention can be applied to various mobile cranes.

REFERENCE SIGNS LIST

1 Mobile crane
11 Vehicle body
12 Swivel
121 Driver cabin
122 Boom
13 Bumper
14 Outrigger
2 Ultrasonic device
21 Ultrasonic sensor
211 Wiring
22 Shielding member
231 Rear plate
232 Shielding plate
3 Ultrasonic device
31 First ultrasonic sensor
311 Wiring
32 Second ultrasonic sensor
321 Wiring
33 Shielding member
331 First rear plate
**331*h*** First sensor hole
332 Second rear plate
**332*h*** Second sensor hole
333 First shielding plate
**333*a*** Shielding-plate upper face
334 Second shielding plate
335 Front plate
4 Ultrasonic device
41 First ultrasonic sensor
42 Second ultrasonic sensor
43 Shielding member
431 First rear plate
432 Second rear plate
433 First shielding plate
**433*a*** Shielding-plate upper face
434 Second shielding plate
435 Front plate
5 Ultrasonic device
51 First ultrasonic sensor
52 Second ultrasonic sensor
53 Shielding bumper
531 First rear plate
532 Second rear plate
533 First shielding plate
**533*a*** Shielding-plate upper face
534 Second shielding plate
535 Front plate
6 Ultrasonic device
61 First ultrasonic sensor
611 Wiring
62 Second ultrasonic sensor
621 Wiring
63 Shielding member
631 First rear plate
**631*a*** Inclined plate
**631*h*** First sensor hole
632 Second rear plate
**632*h*** Second sensor hole
633 First shielding plate
634 Second shielding plate
7 Ultrasonic device
71 First ultrasonic sensor
711 Wiring
72 Second ultrasonic sensor
721 Wiring
73 Shielding member
731 First rear plate
**731*h*** First sensor hole
732 Second rear plate
**732*h*** Second sensor hole
733 First shielding plate
734 Second shielding plate
9 Detection device
OB Detection object
S Ultrasound
R1 Reflected wave
R2 Reflected wave
N Direct wave

The invention claimed is:

1. A mobile crane comprising:
a boom;
a traveling vehicle body supporting the boom;
a distance detection device including an ultrasonic sensor provided on a front side of the traveling vehicle body, the distance detection device being configured to detect a distance between the ultrasonic sensor and a detection object; and
a shielding member provided between the boom in a state allowing traveling and the ultrasonic sensor, the shielding member being configured to block ultrasound emitted by the ultrasonic sensor, wherein
the mobile crane travels with the boom laid forward.

2. The mobile crane according to claim 1, wherein
the shielding member covers the ultrasonic sensor from a side of location of the boom.

3. The mobile crane according to claim 1, wherein
the ultrasonic sensor includes:
a first ultrasonic sensor; and
a second ultrasonic sensor,
the shielding member includes:
a first shielding member provided between the boom in the state allowing traveling and the first ultrasonic sensor, the first shielding member being configured to block ultrasound that heads for the boom and is part of ultrasound emitted by the first ultrasonic sensor; and
a second shielding member provided between the boom in the state allowing traveling and the second ultrasonic sensor, the second shielding member being configured to block ultrasound that heads for the boom and is part of ultrasound emitted by the second ultrasonic sensor, and
the distance detection device detects the distance with the first ultrasonic sensor and the second ultrasonic sensor.

4. The mobile crane according to claim 3, wherein
the shielding member includes a third shielding member provided between the first ultrasonic sensor and the second ultrasonic sensor.

5. The mobile crane according to claim 4, wherein
the third shielding member connects the first shielding member and the second shielding member in a left-right direction.

6. The mobile crane according to claim 3, wherein
the second ultrasonic sensor is provided higher than the first ultrasonic sensor.

7. The mobile crane according to claim 3, wherein a height at which the first ultrasonic sensor is provided and a height at which the second ultrasonic sensor is provided are identical.

8. The mobile crane according to claim 1, wherein the ultrasonic sensor is provided under a bumper of the traveling vehicle.

9. The mobile crane according to claim 1, wherein the shielding member includes part of a bumper of the traveling vehicle.

* * * * *